United States Patent
Boyle

(10) Patent No.: US 8,965,610 B2
(45) Date of Patent: Feb. 24, 2015

(54) PEDAL ASSIST SENSOR

(76) Inventor: Thomas Boyle, Vista, CA (US)

( * ) Notice: Subject to any disclaimer, the term of this patent is extended or adjusted under 35 U.S.C. 154(b) by 0 days.

(21) Appl. No.: 13/475,953

(22) Filed: May 19, 2012

(65) Prior Publication Data

US 2012/0303195 A1   Nov. 29, 2012

Related U.S. Application Data

(60) Provisional application No. 61/489,163, filed on May 23, 2011.

(51) Int. Cl.
*G06F 17/00* (2006.01)

(52) U.S. Cl.
USPC .... 701/22; 180/206.1; 180/206.5; 180/206.7; 474/110; 474/111; 474/119; 474/140; 73/862.01; 324/662; 318/432

(58) Field of Classification Search
USPC .............. 180/205.1–206.1, 206.2, 220, 65.1, 180/206.5, 206.7; 701/36, 22; 477/70; 324/662; 73/862, 862.01; 474/101, 474/111, 119, 140, 110; 318/432
See application file for complete search history.

(56) References Cited

U.S. PATENT DOCUMENTS

| | | | | |
|---|---|---|---|---|
| 5,300,730 A | * | 4/1994 | Ekhaus | 84/734 |
| 5,538,477 A | * | 7/1996 | Bellio et al. | 474/70 |
| 5,647,281 A | * | 7/1997 | Kunczynski | 104/168 |
| 5,758,735 A | * | 6/1998 | MacCready et al. | 180/206.5 |
| RE37,443 E | * | 11/2001 | Yaguchi | 180/205.1 |
| 6,321,657 B1 | * | 11/2001 | Owen | 104/119 |
| 6,945,917 B1 | * | 9/2005 | Baatz | 482/63 |
| 7,042,123 B2 | * | 5/2006 | Kitamura et al. | 310/75 C |
| 7,108,097 B1 | * | 9/2006 | Bolton et al. | 180/206.7 |
| 7,108,907 B1 | * | 9/2006 | Yamane et al. | 428/292.1 |
| 7,469,885 B2 | * | 12/2008 | Englund et al. | 267/156 |
| 7,871,353 B2 | * | 1/2011 | Nichols et al. | 476/37 |
| 7,959,533 B2 | * | 6/2011 | Nichols et al. | 476/37 |
| 7,963,357 B2 | * | 6/2011 | Gulas | 180/206.5 |
| 8,262,536 B2 | * | 9/2012 | Nichols et al. | 476/38 |

(Continued)

FOREIGN PATENT DOCUMENTS

| | | |
|---|---|---|
| JP | 08-067289 | 3/1996 |
| JP | 11-029088 | 2/1999 |
| JP | 11-208565 | 8/1999 |

OTHER PUBLICATIONS

Instrumentation and control of a high power BLDC motor for small vehicle applications; Rowe, A.; Sen Gupta, G.; Demidenko, S. Instrumentation and Measurement Technology Conference (I2MTC), 2012 IEEE International; Digital Object Identifier: 10.1109/I2MTC.2012. 6229466; Publication Year: 2012 , pp. 559-564.*

(Continued)

*Primary Examiner* — Cuong H Nguyen
(74) *Attorney, Agent, or Firm* — Kenneth L. Green

(57) ABSTRACT

Apparatus and method for controlling an electric motor providing assistance to a bicycle rider based on measuring the mechanical power generated by the rider. The power generated by the rider is measured by measuring tension in a bicycle chain (or belt) and RPM. A chain (or belt) roller is carried at the free end of a cantilevered beam and the chain (or belt) rides over the roller. The resulting deflection of the cantilevered beam provides a measurement of chain tension. A control signal for the electric motor is generated based on a smoother version of the power generated by the rider.

19 Claims, 4 Drawing Sheets

(56) References Cited

U.S. PATENT DOCUMENTS

| | | | | |
|---|---|---|---|---|
| 8,317,650 | B2* | 11/2012 | Nichols et al. | 476/38 |
| 8,781,663 | B2* | 7/2014 | Watarai | 701/22 |
| 2003/0132602 | A1* | 7/2003 | Miyoshi | 280/276 |
| 2004/0200294 | A1* | 10/2004 | Tsay et al. | 73/862.322 |
| 2005/0285461 | A1* | 12/2005 | Kitamura et al. | 310/67 A |
| 2007/0089533 | A1* | 4/2007 | Englund et al. | 73/862.01 |
| 2007/0155580 | A1* | 7/2007 | Nichols et al. | 476/36 |
| 2008/0236319 | A1* | 10/2008 | Nichols et al. | 74/446 |
| 2008/0248917 | A1* | 10/2008 | Nichols et al. | 476/36 |
| 2008/0261771 | A1* | 10/2008 | Nichols et al. | 477/37 |
| 2009/0120211 | A1* | 5/2009 | Roovers et al. | 73/862.474 |
| 2010/0219842 | A1* | 9/2010 | Gianetti | 324/662 |
| 2010/0263167 | A1* | 10/2010 | Fox | 16/400 |
| 2010/0318294 | A1* | 12/2010 | Rosing et al. | 701/220 |
| 2011/0048830 | A1* | 3/2011 | Radtke et al. | 180/205 |
| 2011/0254673 | A1* | 10/2011 | Jean et al. | 340/432 |
| 2013/0054065 | A1* | 2/2013 | Komatsu | 701/22 |
| 2013/0054066 | A1* | 2/2013 | Watarai | 701/22 |

OTHER PUBLICATIONS

An electric assist bicycle drive with automatic continuously variable transmission; Watterson, P.A.; Electrical Machines and Systems, 2008. ICEMS 2008. International Conference on; Publication Year: 2008, pp. 2992-2997.*

A new electrically assist scooter; Hodder, A.; Jaquier, P.; Perriard, Y.; Electrical Machines, 2008. ICEM 2008. 18th International Conference on; Digital Object Identifier: 10.1109/ICELMACH.2008.4800040; Publication Year: 2008, pp. 1-6.*

A Reinforcement Learning Based Power Assisted Method with Comfort of Riding for Light Electric Vehicle; Hsu, R.C.et al.; Vehicular Technology Conference (VTC 2010—Spring), 2010 IEEE 71$^{st}$; Digital Object Identifier: 10.1109/VETECS.2010.5493952 Publication Year: 2010, pp. 1-5.*

Arthur Petron, "A Bicycle Electric Assist Unit", B. Sc. MIT 2008; published in Sep. 2010 (part 1 of 2), pp. 1-35.*

Arthur Petron, "A Bicycle Electric Assist Unit", B. Sc. MIT 2008; published in Sep. 2010 (part 2 of 2), pp. 36-68.*

Measuring the cantilever-position-sensitive detector distance and cantilever curvature for cantilever sensor applications Xu, Meng; Tian, Ye; Coates, M.L.; Beaulieu, L.Y.;Review of Scientific Instruments; vol. 80, Issue: 9; Digital Object Identifier: 10.1063/1.3233918; Publication Year: 2009, pp. 095114-095114-6.*

Fabrication and mechanical characterization of ultrashort nanocantilevers; Nilsson, S.G.; Sarwe, E.-L.; Montelius, L. Applied Physics Letters; vol. 83, Issue: 5; Digital Object Identifier: 10.1063/1.1592303; Publication Year: 2003, pp. 990-992.*

Fracture Toughness Assessment of Patterned Cu-Interconnect Stacks by Dual-Cantilever-Beam (DCB) Technique Chumakov, Dmytro; Lindert, F.; Lehr, M.U.; Grillberger, M.; Zschech, E. Semiconductor Manufacturing, IEEE Transactions on;vol. 22, Issue: 4; Digital Object Identifier: 10.1109/TSM.2009.2031794; Publication Year: 2009, p. 592-.*

Dynamic modeling of an L-shape PMN-PT piezo-based manipulator; Jingang Yi; Chang, S.; Kee Moon; Yang Shi American Control Conference, 2008; Digital Object Identifier: 10.1109/ACC.2008.4587078 Publication Year: 2008, pp. 3755-3760.*

* cited by examiner

PEDAL ASSIST SENSOR

The present application claims the priority of U.S. Provisional Patent Application Ser. No. 61/489,163 filed May 23, 2011, which application is incorporated in its entirety herein by reference.

BACKGROUND OF THE INVENTION

The present invention relates to electric bicycles and in particular to controlling electric motor assistance to propelling the electric bicycle based on a rider's pedaling.

There is both a desire among consumers, and regulations requiring, that the electric motor power provided to the drive train of electric assisted bicycles be tied to the rider's manual power input via the pedals. That is, electric power is delivered to the drive train only if the rider manually rotates the pedals and then, such electric power must match or be some percentage of the actual power manually provided by the rider. Such electric bike systems are alternately referred to as Pedal Assist, PAS or Pedelec.

In order for such Pedal Assist systems to work, an accurate measurement of the power manually generated by the rider through the pedals must be made. Known systems for measuring the power provided by the rider are expensive to manufacture and there is a need for a power measuring device and method which is low cost with relation to the entire electric bicycle cost. Further, complex systems are often prone to failure and there is a need for a durable and low or zero maintenance system. Complex systems may further require calibration and adjustment and there is a need for a system which is easy to calibrate and adjust to obtain the desired accuracy.

Additionally, there is a need for a measurement device which can be fit onto existing bicycles with little or no modification to the existing vehicle thus allowing for a kit which can be attached by the consumer or manufacturer of existing bicycles.

BRIEF SUMMARY OF THE INVENTION

The present invention addresses the above and other needs by providing an apparatus and method for controlling an electric motor providing assistance to a bicycle rider based on measuring the mechanical power generated by the rider. The power generated by the rider is measured by measuring tension in a bicycle chain (or belt) and RPM. A chain (or belt) roller is carried at the free end of a cantilevered beam and the chain (or belt) rides over the roller. The resulting deflection of the cantilevered beam provides a measurement of chain tension. A control signal for the electric motor is generated based on a smoother version of the power generated by the rider.

In accordance with one aspect of the invention, there is a provided control system for an electric bicycle. The control system includes: an electric motor for assisting a rider pedaling the bicycle; a bicycle chain; a sensor measuring tension in the bicycle chain to generate raw chain tension data; a processor computing a control signal for the electric motor. The control system computed: revolutions per minute of a crank assembly using the raw chain tension data; a smoothed value of the raw chain tension data; average power generated by pedaling; and a control signal for the electric motor proportional to the average power generated by pedaling.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1C:
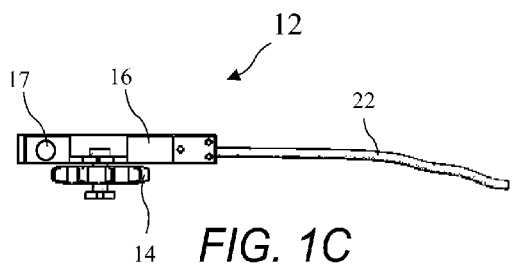
FIG. 1C is a top view of the sensor assembly according to the present invention for measuring rider generated torque in a bicycle chain.
Figure 2:
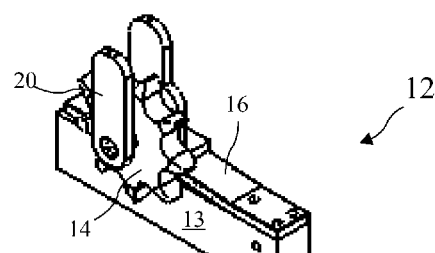
FIG. 2 is a perspective view of the sensor assembly according to the present invention for measuring rider generated torque in a bicycle chain.
Figure 1A:
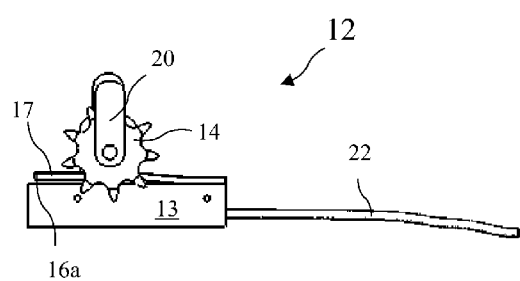
FIG. 1A is a left side view of a sensor assembly according to the present invention for measuring rider generated torque in a bicycle chain.
Figure 1B:
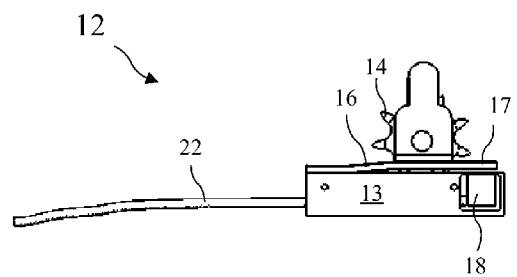
FIG. 1B is a right side view of the sensor assembly according to the present invention for measuring rider generated torque in a bicycle chain.

A left side view of a sensor assembly 12 according to the present invention for measuring rider generated torque in a bicycle chain 34 (see FIG. 7) is shown in FIG. 1A, a right side view of the sensor assembly 12 is shown in FIG. 1B, a top side view of the sensor assembly 12 is shown in FIG. 1C, and a perspective view of the sensor assembly 12 is shown in FIG. 2. A displacement transducer located in the non-fixed end 16a of a cantilevered beam 16 measures the deflection of the non-fixed end 16a to determine the tension in the chain 34.

For example, a magnet 17 may be located in the non-fixed end 16a of the cantilevered beam 16 and a Hall effect sensor 18 may be positioned in a fixed enclosure 13 so that one of the poles of the magnet 17 is directly over the Hall effect sensor 18. The distance between the magnet 17 surface and the Hall effect sensor is typically ⅛ inches. The sensor assembly 12 is fitted with a chain roller 14 and guide 20 for cooperation with the chain 34 (see FIG. 7).

The cantilevered beam 16 is a preferred embodiment, but any apparatus for measuring chain tension by measuring a force normal to the chain path is intended to come within the scope of the present invention, for example, a plunger and coil spring.

When force is exerted on the chain roller 14 by the chain 34, the non-fixed end 16a of the beam 16 moves. The movement causes the magnet 17 to move closer the fixed Hall sensor 18. The Hall sensor 18 senses a change in the magnetic field and causes its electrical output to vary with the position in the magnet 17.

The design of the cantilevered beam 16 is such that it is not stressed to the point where it would fail over time. Typically the total movement of the magnet 17 relative to the fixed Hall sensor 18 is less then approximately ⅛ inch. The scale or size of the component parts of the system can vary to fit the application and force to be measured.

The fixed enclosure 13 carrying the Hall sensor 18 is sealed and waterproof to survive extreme wet and dirty conditions.

The sensor assembly 12 is typically powered with approximately +5 volts and a common wire. A third wire carries the sensor signal that represents the force applied to the cantilevered beam 16.

The base analog Hall sensor 18 generates a high level electrical signal that is ratio metric to the power supply. This high signal level eliminates the need for high gain signal conditioning that would be required for a similar strain gauge based measurement system.

Figure 3:
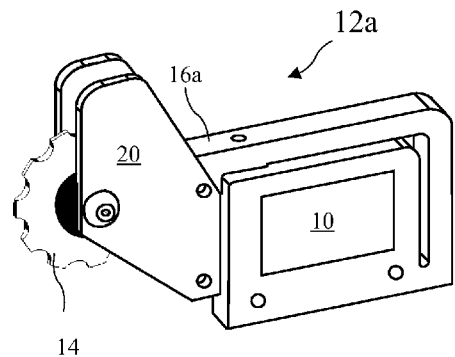
FIG. 3 is a perspective view of a second embodiment of the sensor assembly according to the present invention for measuring rider generated torque in a bicycle chain.
Figure 4:
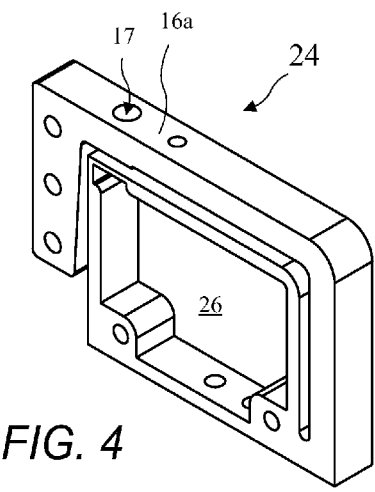
FIG. 4 is a perspective view of a housing of the second embodiment of the sensor assembly according to the present invention for measuring rider generated torque in a bicycle chain.
Figure 5B:
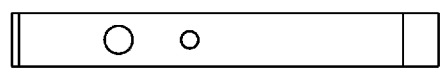
FIG. 5B is a top view of the housing of the second embodiment of the sensor assembly according to the present invention for measuring rider generated torque in a bicycle chain.
Figure 5C:
FIG. 5C is a front view of the housing of the second embodiment of the view sensor assembly according to the present invention for measuring rider generated torque in a bicycle chain.
Figure 5A:
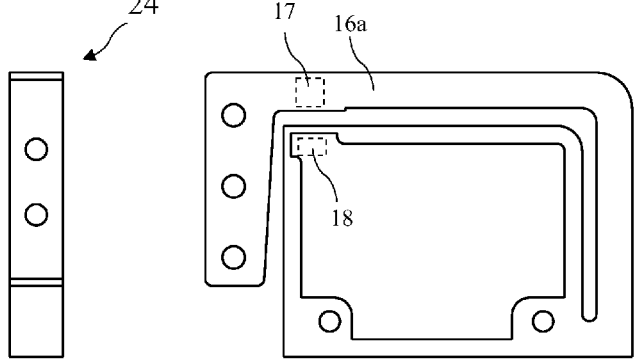
FIG. 5A is a left side view of the housing of the second embodiment of the sensor assembly according to the present invention for measuring rider generated torque in a bicycle chain.
Figure 5D:
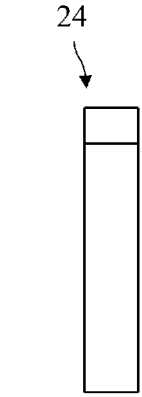
FIG. 5D is a rear view of the housing of the second embodiment of the view sensor assembly according to the present invention for measuring rider generated torque in a bicycle chain.

A perspective view of a second embodiment of the sensor assembly 12a according to the present invention for measuring rider generated torque in a bicycle chain is shown in FIG. 3, a perspective view of a housing 24 of the sensor assembly 12a is shown in FIG. 4, a left side view of the housing 24 is shown in FIG. 5A, a top view of the housing 24 is shown in FIG. 5B, a front view of the housing 24 is shown in FIG. 5C, and a rear view of the housing 24 is shown in FIG. 5D. The housing 24 includes an arm 16 being an integral part of the housing 24. Such single piece housing and arm provides a consistent measurement. A cavity 26 in the housing 24 is provided for a circuit 10.

Figure 6:
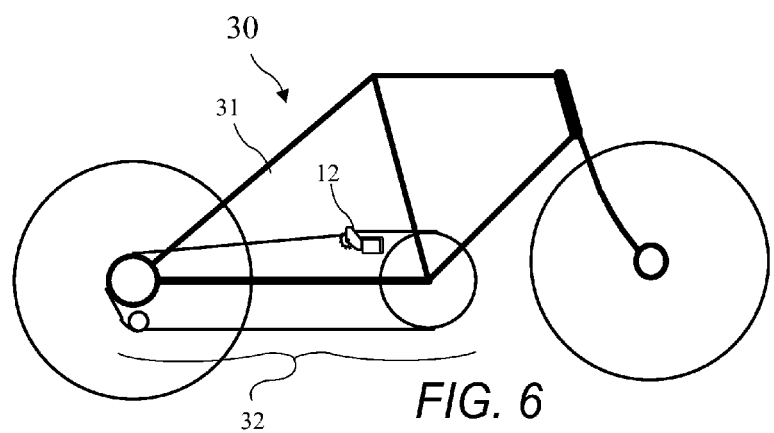
FIG. 6 is a right side view of a bicycle having the sensor attached to the bicycle according to the present invention.
Figure 7:
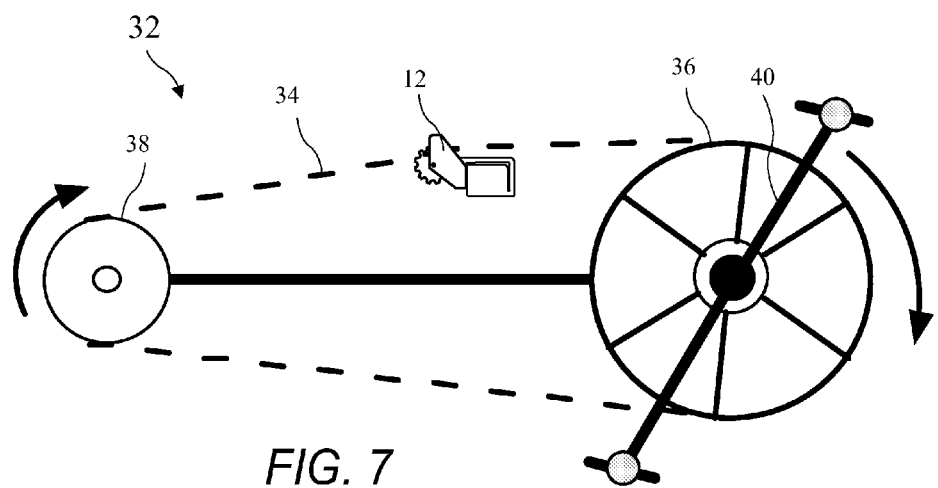
FIG. 7 is a right side view of a bicycle chain, pedals, and sprockets and the sensor configured for measuring chain torque according to the present invention.

A right side view of a bicycle 30 having the sensor assembly 12 or 12a attached to the bicycle frame 31 according to the present invention is shown in FIG. 6 and a right side view of a bicycle chain 34, crank 40 and sprockets 36 and 38 are shown in FIG. 7. To measure human power applied to pedaling the bicycle 30, the sensor assembly 12 or 12a is fitted with the chain roller 14 and the guide 20 (see FIGS. 1A-5D). The complete sensor assembly 12 or 12a is preferably mounted to a fixed location on the bicycle frame 31 where the chain roller 14 is directly under the chain 34 and to the rear of the crank 40. The cantilevered beam 16 or 16a is allowed to bend with chain force on the chain roller 14. The chain 34 is adjusted so that it places force on the roller proportional to the pedal force applied to the crank.

Figure 8:
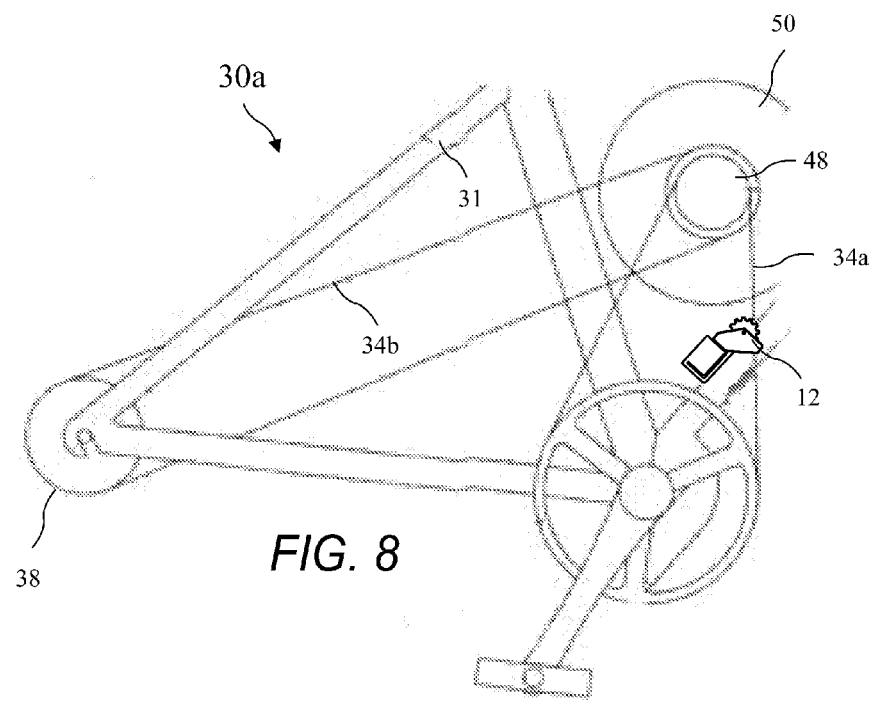
FIG. 8 is a right side view of a bicycle having the sensor attached to the bicycle and an electric motor for providing assistance according to the present invention.
Figure 9:
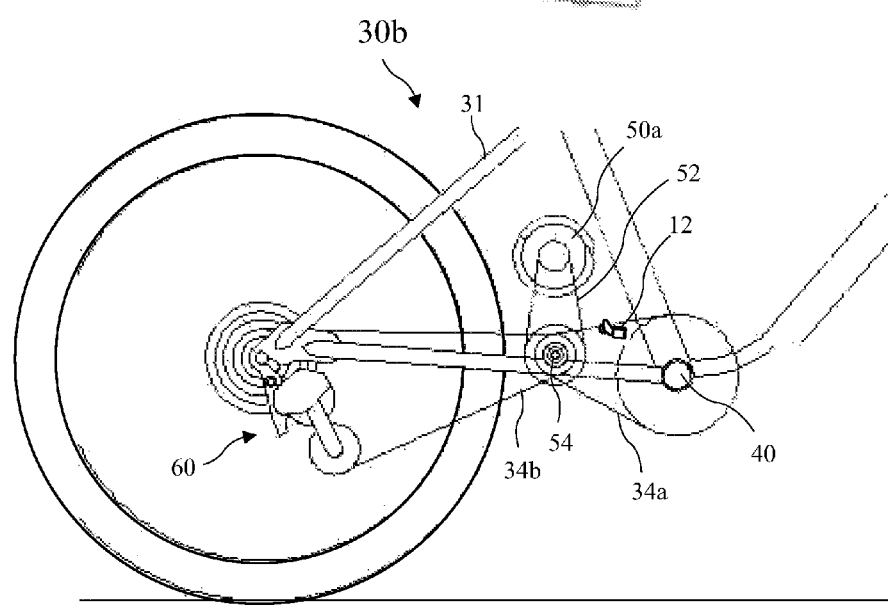
FIG. 9 is a right side view of a bicycle having the sensor attached to the bicycle and an electric motor for providing assistance according to the present invention.

A right side view of a bicycle 30a having the sensor assembly 12 or 12a attached to the bicycle, and an electric motor 50 for providing assistance according to the present invention, is shown in FIG. 8, and a right side view of a bicycle 30b with a derailer 60 having the sensor assembly 12 or 12a attached to the bicycle, and a high speed electric motor 50a for providing assistance, is shown in FIG. 9. By placing the torque sensor on a pedal chain 34a which is then connected directly to a low speed (under 300 RPM) motor, and then connecting said motor 50 via a second chain 34b or belt to a rear wheel transmission (e.g., the derailleur 60) commonly used on bicycles, all energy generated by the rider and motor 50 would have the benefit of being fed into a multispeed transmission gaining the same benefit an unaided rider would gain from said transmission. By placing the chain 34a from the crank 40 to the motor 50 on a freewheel 48, the rider would have the option of running the motor 50 directly into the transmission 60 without having to pedal in localities where pedal assist is not a regulatory requirement.

Alternately, the high speed motor 50a could be used in exactly the same manner if the pedal chain 34a were connected to an intermediate shaft 54 with the sensor assembly 12 mounted as previously described. The high speed motor 50a could be connected via chain 52 or belt to the same intermediate shaft 54 through a free wheel allowing for a speed reduction through gear ratios which would bring down the rotational speed coming off the motor 50a to a rate which would match up with the manual pedal speed of the rider. The chain or belt 34a would then connect to a rear transmission 60 and would transfer all force generated by either or both the motor 50a and rider into the transmission 60.

In some applications where the analog output electrical signal must interface with an existing device, a simple signal conditioner can be built into the system. The electrical signal can also be easily configured to a pulse width modulated configuration within the sensor enclosure if the system requires a non-analog or digital signal from the sensor.

At startup, the device may establish a "zero position" for the sensor assembly 12 or 12a under the assumption that there is no significant force or torque placed on the pedals by the rider. Should tension subsequently drop below that initial "zero position", each subsequent low measurement would create a new "zero position" for that riding. All measurement above "zero position" will be measured as force or torque generated by the rider.

Data from the sensor assembly 12 or 12a is provided to a processor to control the motor 50. When the rider begins to pedal the bicycle (or any pedal driven vehicle), the action of pedal rotation produces an uneven chain tension measurement as the rider cycles through each crank rotation. One rotation will consist of two peaks as the right and left foot each rotate the pedal crank 360 degrees. The processor processes the raw tension data to detect peaks in the tension to compute RPM. The processor then computes torque in the crank from the measured chain tension times the crank sprocket radius and multiplies the torque times the computed RPM to compute the power generated by the rider.

In cases where the power generated by the rider using the crank and the power of the motor are fed into some kind of a transmission to increase efficiency, the processor may use crank sprocket torque and pedal rotation speed to determine optimum gear position in the transmission and shift the transmission. During instances in which the crank sprocket torque is increasing while the crank RPM (or vehicle speed measured at the wheel) is steady or decreasing, the processor may shift to a lower gear or gear ratio. During instances in which the pedal torque is decreasing while the rotational pedal speed (or vehicle speed measured at the wheel) is increasing, the processor shift to a higher gear or gear ratio.

Software may incorporate a sleep and wake up function which keeps the sensor assembly 12 or 12a from outputting a motor signal when first powered up. If the pedals have no force applied, the sensor assembly 12 or 12a will enter a preset sleep condition. This is a safety feature to prevent torque sensor output and motor activation while the rider is not on the bike.

The sensor assembly 12 or 12a may further include a speed sensor input to determine when the bicycle 30 is in motion. The speed sensor may detect wheel rotation and true vehicle speed and the sensor assembly 12 or 12a may limit the torque sensor output based on bicycle or vehicle speed as may be required in some installations by regulation. The speed sensor may also be used to restrict or prevent the torque sensor output until the sensor detects the vehicle wheel is in motion.

While the invention herein disclosed has been described by means of specific embodiments and applications thereof, numerous modifications and variations could be made thereto by those skilled in the art without departing from the scope of the invention set forth in the claims.

I claim:

1. A motor control system for an electric bicycle comprising:
   an electric motor for assisting a rider pedaling the bicycle;
   a mechanical power transfer apparatus comprising a belt or a bicycle chain;
   a deflection sensor measuring tension in the mechanical power transfer apparatus to generate tension data, the deflection sensor comprising a displacement transducer and a cantilevered beam, and the tension data is related to a deflection of the cantilevered beam measured by the displacement transducer;
   a processor computing:
      tension data of the belt or bicycle chain from the deflection of the cantilevered beam;
      peak torque events in the tension data;
      Revolutions Per Minute (RPM) of a crank assembly by counting two peak torque events as one revolution;
      pedal torque data from the tension data;
      power from the RPM and the torque; and
      a control signal for the electric motor proportional to the power generated by pedaling.

2. A motor control system for an electric bicycle comprising:
   pedals for a rider to pedal the bicycle;
   an electric motor for assisting the rider pedaling the bicycle;
   a mechanical power transfer apparatus comprising a belt coupling the pedals to a bicycle wheel;
   a housing including:
      a cavity for a sensor circuit; and
      a cantilevered beam;
   a deflection sensor measuring tension in the belt to generate tension data, the deflection sensor comprising a displacement transducer and a cantilevered beam, and the tension data is related to a deflection of the cantilevered beam measured by the displacement transducer;
   a processor computing:
      tension data of the belt from the deflection of the cantilevered beam;
      peak torque events in the tension data;
      Revolutions Per Minute (RPM) of a crank assembly by counting two peak torque events as one revolution;
      pedal torque data from the belt tension data;
      power from the RPM and the torque; and
      a control signal for the electric motor proportional to the power generated by pedaling.

3. The motor control system of claim 1, wherein the displacement transducer is a Hall effect sensor used to measure the deflection of the cantilevered beam.

4. The motor control system of claim 1, wherein the Hall effect sensor resides in a tension sensor housing and magnet is attached to a free end of the cantilevered beam to measure cantilevered beam deflection.

5. The motor control system of claim 1, wherein the deflection sensor includes a housing for a circuit and the cantilevered beam formed from a single piece.

6. The motor control system of claim 5, wherein the single piece housing and cantilevered beam comprises an "L" shaped cantilevered beam attached to the housing at a first end and carrying a sensor at an opposite end.

7. The motor control system of claim 2, wherein the displacement transducer is a Hall effect sensor used to measure the deflection of the cantilevered beam.

8. The motor control system of claim 1, wherein a roller is attached near a free end of the cantilevered beam.

9. The motor control system of claim 8, wherein a guide is attached to the cantilevered beam proximal to the roller.

10. A motor control system for an electric bicycle comprising:
    pedals for a rider to pedal the bicycle;
    an electric motor for assisting the rider pedaling the bicycle;
    a mechanical power transfer apparatus comprising a bicycle chain coupling the pedals to a bicycle wheel;
    a deflection sensor measuring tension in the bicycle chain to generate tension data, the deflection sensor comprising a displacement transducer and a cantilevered beam, and the tension data is related to a deflection of the cantilevered beam measured by the displacement transducer;
    a processor computing:
       tension data of the bicycle chain from the deflection of the cantilevered beam;
       peak torque events in the tension data;
       Revolutions Per Minute (RPM) of a crank assembly by counting two peak torque events as one revolution;
       pedal torque data from the chain tension data;
       power from the RPM and the torque; and
       a control signal for the electric motor proportional to the power generated by pedaling.

11. The motor control system of claim 10, wherein the displacement transducer is a Hall effect sensor used to measure the deflection of the cantilevered beam.

12. The motor control system of claim 1, wherein the mechanical power transfer apparatus is the belt.

13. The motor control system of claim 12, wherein a belt roller is attached near a free end of the cantilevered beam.

14. The motor control system of claim 13, wherein a belt guide is attached to the cantilevered beam proximal to the belt roller.

15. The motor control system of claim 1, wherein the mechanical power transfer apparatus is the bicycle chain.

16. The motor control system of claim 15, wherein a chain roller is attached near a free end of the cantilevered beam.

17. The motor control system of claim 16, wherein a chain guide is attached to the cantilevered beam proximal to the chain roller.

18. The motor control system of claim 2, wherein:
    the cantilevered beam is "L" shaped and comprises:
       a first leg reaching parallel with a first side of the housing and attached to the housing at a first end; and
       a second leg turned about 90 degrees from the first leg and reaching parallel with a second side of the housing and attached to a second end of the first leg opposite the first end; and a first sensor element of the deflection sensor is attached to the second leg proximal to an end of the second leg opposite to the first leg.

19. The motor control system of claim 18, wherein:

the displacement transducer includes a Hall effect sensor attached to the housing adjacent to the first sensor element; and the first sensor element is a magnet.

* * * * *